Feb. 6, 1940.  S. FUJIMOTO  2,189,516
INCLINOMETER
Filed Aug. 8, 1939   2 Sheets-Sheet 1

WITNESSES

INVENTOR
Saburo Fujimoto
BY
ATTORNEYS

Feb. 6, 1940. S. FUJIMOTO 2,189,516
INCLINOMETER
Filed Aug. 8, 1939 2 Sheets-Sheet 2
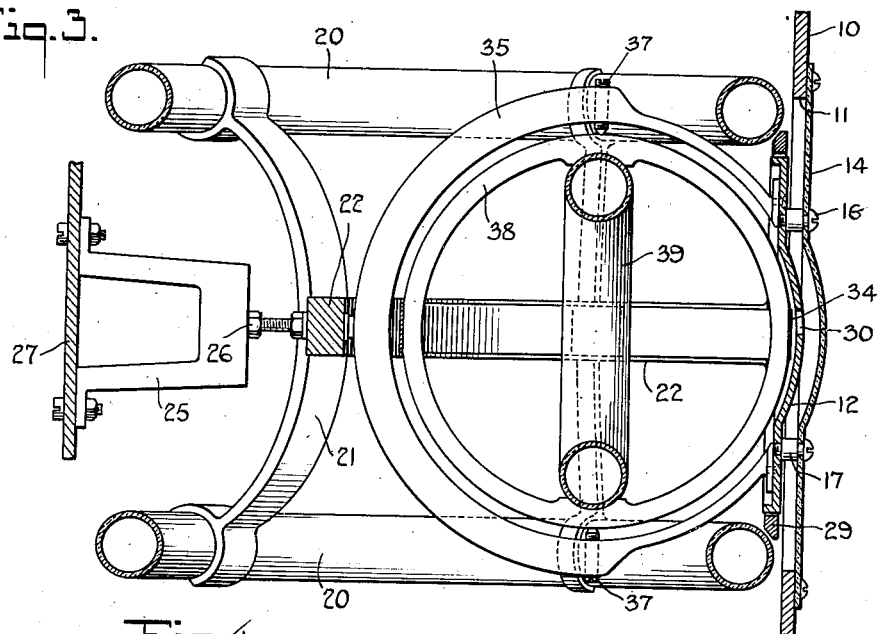
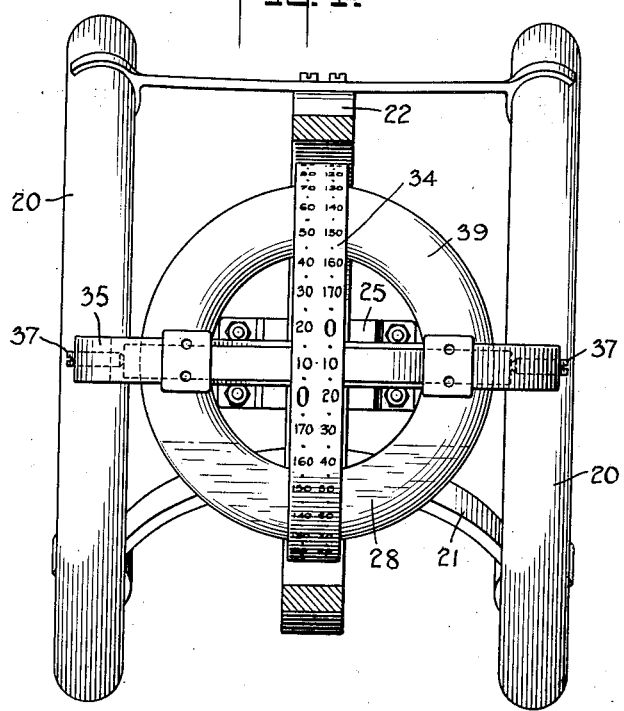
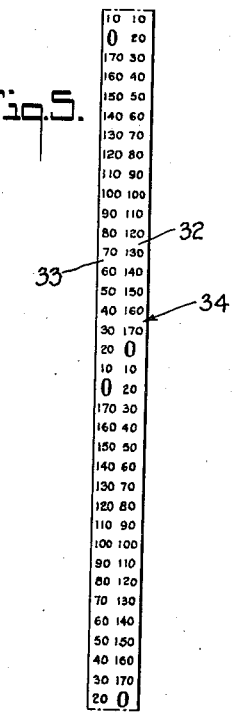
WITNESSES
INVENTOR
Saburo Fujimoto
BY
ATTORNEYS

Patented Feb. 6, 1940

2,189,516

UNITED STATES PATENT OFFICE

2,189,516

INCLINOMETER

Saburo Fujimoto, Honolulu, Territory of Hawaii

Application August 8, 1939, Serial No. 288,907

4 Claims. (Cl. 33—206)

This invention relates to an improved inclinometer for indicating both the transverse and longitudinal angles of inclination of aircraft.

It will be appreciated that in aircraft it is desirable and even necessary at times that the pilot be accurately appraised of the angle of ascent and descent of the aircraft and also of the lateral angle of inclination thereof. Instruments for indicating the angle of inclination of aircraft have heretofore been provided. However, these have been subject to certain criticisms as, for instance, some of them did not indicate both the longitudinal and transverse angles of inclination while others did not accurately indicate the longitudinal angle of inclination when the plane was inclined laterally and vice versa. Also, many of the instruments were cumbersome and expensive to manufacture and had many moving parts which would readily get out of order.

It is a particular object of the present invention to provide an improved inclinometer which overcomes the difficulties heretofore encountered and which will accurately indicate both the transverse and longitudinal angles of inclination of the aircraft in substantially any position thereof.

A further object is the provision of an improved instrument of the above character which is simple and compact in structure, which will not readily get out of order, and which is economical to manufacture but nevertheless accurate.

My invention contemplates the utilization of vertically disposed circular or arcuate members, one or more of which are substantially parallel to the longitudinal axis and the remainder of which are parallel to the transverse axis of the aircraft. The members are pivotally mounted and are provided with shiftable ballast or weights which may travel along the peripheries thereof so that regardless of the angle of inclination of the aircraft the ballast will be disposed at the lowest part of the members. In this way the members are maintained in substantially vertical position and by connecting them to suitable indicators both the lateral and longitudinal angle of inclination of the aircraft will be displayed at all times.

For a fuller understanding of my invention reference should be had to the accompanying drawings, in which:

Fig. 3 is a sectional view in the direction of the arrows on the line 3—3 of Fig. 2;

Figure 2:
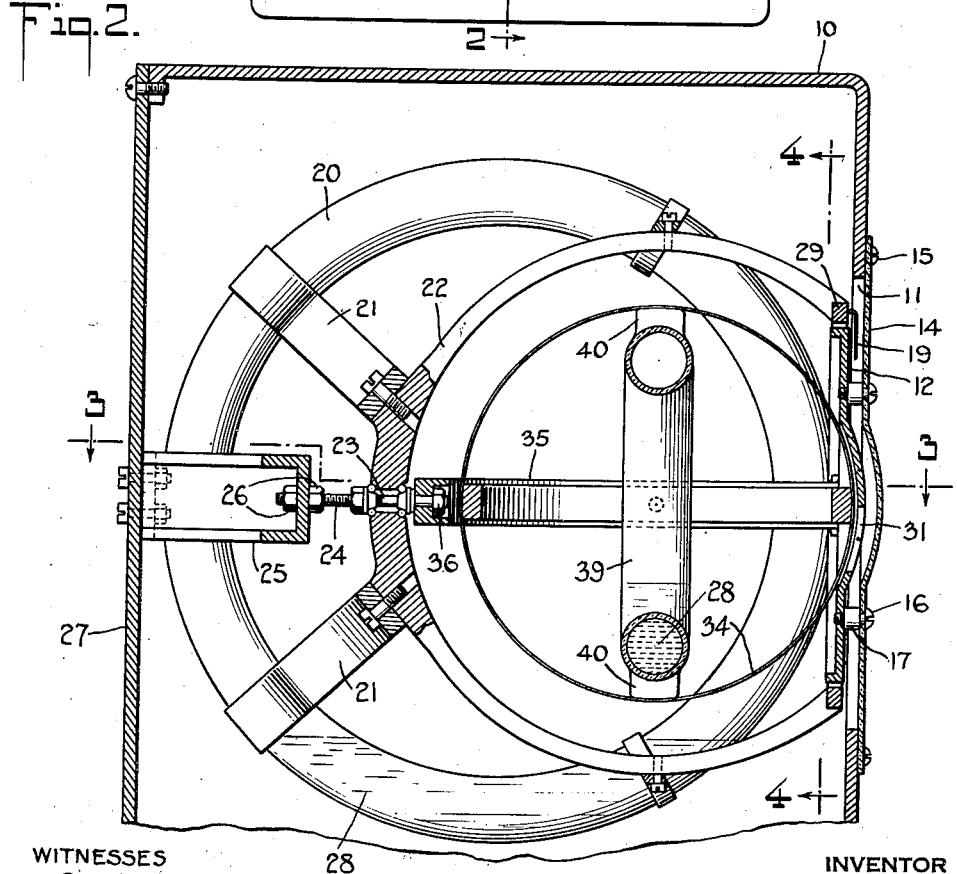
Fig. 2 is a longitudinal sectional view in elevation in the direction of the arrows on the line 2—2 of Fig. 1.

Fig. 4 is a front elevation in the direction of the arrows on the line 4—4 of Fig. 2 showing the gravity stabilized rings and their associated mechanism removed from the casing; and Fig. 5 shows one type of scale which may be used in my inclinometer and which is divided into degrees for indicating the angle of ascent and descent of the aircraft. The scale is formed on a circular band but for the sake of clarity the band is illustrated in this figure in straight or flat form.

My improved inclinometer is suitably mounted in the aircraft so that the supports thereof are rigid with the aircraft and will assume the angle of ascent and descent and also the angles of lateral inclination thereof. For this purpose, the inclinometer may be enclosed in a casing 10 which is suitably attached to the instrument panel of the aircraft and faces rearwardly towards the pilot. Instead of being enclosed in a casing 10 it will be appreciated that the inclinometer may be mounted directly on the body of the plane preferably on the instrument panel thereof.

The front of the casing is provided with an opening 11 through which the dial face 12 of the instrument is displayed and which is preferably covered by means of a protective transparent panel 14 connected to the casing in some suitable manner as by means of the screws 15. The transparent panel 14 is also connected to the dial face 12 as by means of the machine screws 16, spacing collars 17 being interposed between the panel and the dial face in the manner shown so as to properly space the members from each other.

As previously stated the casing 10 is rigidly mounted on the airplane and due to the interconnection between the casing, the transparent panel, and the dial face it will be appreciated that the dial face assumes both the lateral and longitudinal angles of inclinations of the aircraft.

The dial face 12 is suitably formed so as to display in some convenient manner, as in degrees, the angle of inclination of the aircraft. Thus, adjacent the periphery thereof it is provided with a scale 18 which indicates the transverse angle of inclination. The scale is divided in degrees, starting at zero at the top and running in both directions around the periphery thereof to 180 at the bottom of the scale and suitable numerals are provided to facilitate reading thereof. The transverse angle of inclination of the plane is indicated on the scale 18 by means of a pointer 19 which is gravity stabilized so as to always depend downwardly from the highest point and since the dial face partakes of the inclinations of the airplane the pointer will indicate on the scale the transverse angle of inclination of the plane.

The mechanism whereby the pointer 19 is stabilized so as not to be affected by the transverse inclinations of the aircraft comprises one or more circular or arcuate members which are pivotally mounted parallel to the longitudinal axis of the aircraft and which are provided with ballast or weights which may shift along the periphery thereof in response to the action of gravity so as to always hold the members in vertical position. I have found in actual practice that satisfactory results are obtained by employing a pair of tubular rings 20 of the same size and made of some suitable material which will not be affected by the mercury which is preferably used as the ballast to stabilize the rings. For this purpose I may employ glass, plastics or metal which is treated or coated so as not to be amalgamated by the mercury. The rings are arranged in spaced relationship, as shown, parallel to each other and to the longitudinal axis of the aircraft and in a substantially vertical plane. They are suitably connected together by a plurality of braces 21 which also connect them to a forked yoke 22 which is disposed intermediate the rings and parallel thereto.

As previously stated the rings 20 are pivotally mounted and this mounting may comprise a ball bearing 23 extending through the center of the yoke 22 and disposed around the shaft 24 which in turn is rigidly connected to the bracket 25 as by means of the nuts 26 threaded to the end of the shaft and engaging the two sides of the bracket as shown most clearly in Fig. 2. The bracket 25 is in turn rigidly connected to the back 27 of casing 10 and in this way the bracket and shaft 24 assume both the lateral and longitudinal angles of inclination of the aircraft. It will be appreciated however that since the ball bearing 23 is provided between the yoke 22 and the shaft, the yoke and rings 20 are not affected by lateral inclination of the aircraft.

So as to stabilize the assembly of yoke and rings 20 and hold them in vertical or upright position regardless of the lateral inclinations of the aircraft, I provide the rings with suitable ballast or weights which may shift around the peripheries thereof in response to changes in the longitudinal angle of inclination of the aircraft. The weight preferably takes the form of a free-flowing heavy liquid such as mercury which is disposed inside the tubular rings as indicated at 26. It will be appreciated that in response to longitudinal inclination of the aircraft the mercury will always flow to the lowest point of the rings and will maintain them in substantially vertical position regardless of transverse inclinations of the aircraft.

The pointer 19 is mounted at the forward end 29 of the upper arm of yoke 22 and depends downwardly therefrom as shown most clearly in Fig. 2. Since the yoke 22 is connected to the rings 20 by the braces 21 it will be appreciated that the entire assembly of rings, yoke, and pointer are stabilized so as to be unaffected by transverse inclination of the aircraft. Upon transverse inclination of the aircraft the dial face 12 will be caused to assume the angle of the aircraft with the result that pointer 19 will indicate on the scale 18 the transverse angle of inclination in degrees. Upon inclination of the aircraft towards the right the pointer 19 will register the angle of inclination on the left-hand side of the scale 18 and upon inclination of the aircraft to the left the pointer will register that angle on the right-hand side of the scale.

Figure 1:
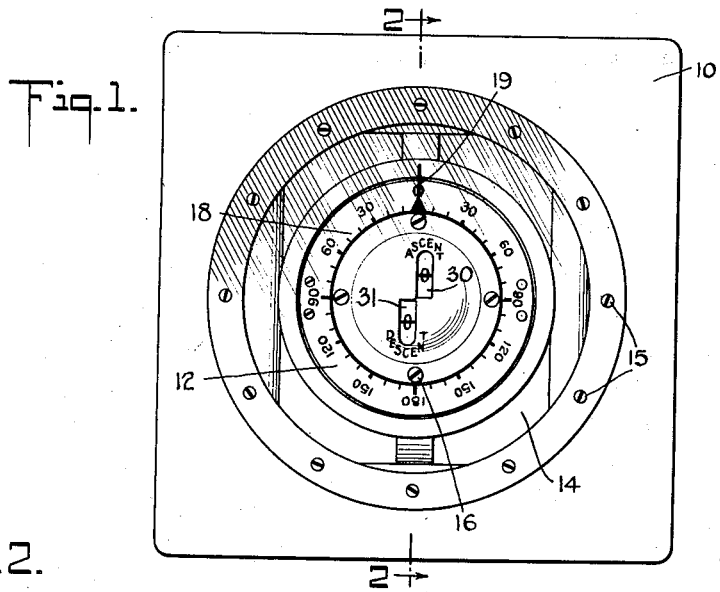
Fig. 1 is a front elevation of an inclinometer embodying my invention.

The longitudinal angles of inclination of the aircraft, that is, the angles of ascent and descent are also indicated on the dial face 12. For this purpose the dial face is provided with a pair of openings 30 and 31 which may be formed respectively to the right and above the center of the dial and below and to the left of the center thereof. The angle of ascent is displayed through the opening 30 and angle of descent is displayed through the opening 31 and the respective openings may be suitably labelled in the manner indicated in Fig. 1.

The angles of ascent and descent of the aircraft are displayed through the openings 30 and 31 from the scales 32 and 33 respectively which are formed upon a circular band 34 which in turn is stabilized so as not to be affected by the longitudinal inclinations of the aircraft. The respective scales are preferably calibrated to degrees and are provided with 10-degree divisions running from zero at the front of the scale through 170 at the back of the scale. The respective zeros are positioned so as to be displayed through the openings 30 and 31 when the longitudinal axis of the aircraft is substantially horizontal. Scale 32 starts at the front and runs around the bottom of the band as shown to the numeral 170 and is then repeated around the top of the band. Scale 33 runs in the opposite direction from the front over the top of the band and is then repeated around the bottom of the band. The purpose of repeating the two scales in this manner is to provide for an accurate reading of the device in the contingency that the aircraft should make a half turn both longitudinally and laterally in which event the portion of the scale which is normally at the back of the band will be displayed through the openings 30 and 31.

The mechanism for stabilizing the band so that it will not be affected by longitudinal inclinations of the aircraft comprises a yoke 35 rigidly fixed at its center to the end of shaft 24 as by means of the nut 36 so that the yoke partakes of both the lateral and longitudinal inclinations of the aircraft. The free ends of the yoke are preferably connected to the back of dial face 12, as shown. Pivotally mounted between the two sides of the yoke 35 as by means of the pointed pins 37 is a ring 38 to which the tubular ring 39 is fixedly connected, the tubular ring being disposed inside of the ring 38 at substantially right angles thereto and the points of connection being adjacent the pivotal pins 37 as shown. The ring 39 is disposed substantially transversely of the aircraft and is similar to but smaller than the rings 20, being held or stabilized in vertical position so as not to be affected by the longitudinal inclinations of the aircraft by means of a shiftable weight, preferably taking the form of a free-flowing heavy liquid such as mercury as indicated at 28. The band 34 is disposed around the rings 38 and 39 substantially parallel to the rings 20 and in order to provide proper support for the band, lugs 40 may be provided on the periphery of the ring 39 adjacent the top and bottom thereof. It will be seen that the ring 39 is held in vertical position by means of the mercury 28, regardless of the longitudinal angle of inclination of the aircraft and since the band 34 is fixed with respect to the ring 39 the respective scales thereon will always be displayed at the same angle. Dial 28 on the other end is fixed with respect to the aircraft and partakes of the longitudinal inclinations thereof. Accordingly when the aircraft assumes an angle of ascent the size of the angle in degrees will be displayed through the opening 30 and conversely when the aircraft assumes an angle of descent the size of the angle in degrees will be displayed through the opening 31.

At times, when the angle of ascent or descent is small, there might be some uncertainty in the mind of the pilot as to whether the plane is ascending or descending. Under those circumstances the pilot is guided by the smaller reading, that is, the opening displaying the smaller reading indicates the proper longitudinal angle of inclination of the aircraft.

In using my improved inclinometer it is mounted on the aircraft in the manner previously described so that the casing 10 and the dial face 12 assume both the longitudinal and lateral angles of inclination of the aircraft. With the scales 32 and 33 arranged in the manner shown the dial face should be displayed towards the rear of the aircraft. However, by arranging the scales in an opposite manner the dial face may be displayed forwardly. The lateral angle of inclination of the aircraft is indicated by pointer 19 on scale 18 and the longitudinal angle of inclination is displayed through either of the openings 30 or 31 depending upon whether the plane is ascending or descending. Due to the rings 20 and 39 and the shiftable ballast therein the respective angles of inclination are accurately indicated in substantially all positions of the aircraft.

Various modifications may be made in the illustrated and described embodiment of my invention such as varying the type of ballast employed and the number of rings used for both the transverse and longitudinal inclinations of the aircraft.

While my invention is primarily suited for use in aircraft it should be understood that it may also be used in other associations as for instance ships.

I claim:

1. An inclinometer for indicating the angles of inclination of aircraft or the like, comprising a support adapted to be rigidly connected to an aircraft so as to assume the angles of inclination thereof, a member having a tubular arcuate portion pivotally mounted on the support so that it may pivot transversely of the arcuate portion with respect to the support, ballast comprising a free-flowing material disposed in the tubular arcuate portion so as to hold the member in vertical position regardless of the angle of inclination of the support, and cooperating indicating means connected to the support and to the said member whereby the angle of inclination of the support and accordingly of the aircraft relative to the member may be determined.

2. An inclinometer for indicating the angles of inclination of aircraft or the like, comprising a support adapted to be rigidly connected to an aircraft so as to assume the angles of inclination thereof, a plurlity of members each having a tubular arcuate portion adjacent the bottom thereof pivotally mounted on the support so that they may pivot transversely of the arcuate portions, at least one of said members being disposed at right angles to the remainder, shiftable ballast comprising a free-flowing material disposed in the tubular portions so as to maintain the members in upright position regardless of the angle of inclination of the support, and cooperating indicating means connected to the said members and to the support whereby the angles of inclination of the support and accordingly of the aircraft relative to the members may be determined.

3. An inclinometer for indicating the angles of inclination of aircraft or the like, comprising a support adapted to be rigidly connected to an aircraft so as to assume the angles of inclination thereof, a tubular ring pivotally mounted on the support so that it may pivot around one diameter thereof transversely of its periphery, shiftable ballast comprising a free-flowing material disposed in the tubular ring for maintaining the ring with one diameter in substantially vertical position regardless of the angle of inclination of the support, and cooperating indicating means connected to the support and to the ring for indicating the angles of inclination of the support with respect to the vertical diameter of the ring.

4. An inclinometer for indicating the angles of inclination of aircraft or the like, comprising a support adapted to be rigidly connected to an aircraft so as to assume the angles of inclination thereof, a plurality of tubular rings pivotally mounted on the support so that each may pivot around one diameter thereof transversely of its periphery at least one of the rings being disposed substantially at right angles to the remainder, shiftable ballast comprising a free-flowing material disposed in the rings so that each is held with one diameter in vertical position regardless of the angles of inclination of the support, and cooperating indicating means connected to the support and to the rings for indicating the angles of inclination of the support and accordingly of the aircraft relative to the vertical diameter of the rings.

SABURO FUJIMOTO.